United States Patent
Teraoka (10) Patent No.: US 9,715,087 B2
(45) Date of Patent: Jul. 25, 2017

(54) IMAGING LENS (71) Applicant: Hiroyuki Teraoka, Shenzhen (CN)

(72) Inventor: Hiroyuki Teraoka, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/080,391

(22) Filed: Mar. 24, 2016

(65) Prior Publication Data

US 2017/0023771 A1  Jan. 26, 2017

(30) Foreign Application Priority Data

Jul. 21, 2015  (JP) .................................. 2015-143753

(51) Int. Cl.
*G02B 3/02* (2006.01)
*G02B 13/18* (2006.01)
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC ...... G02B 13/0045; G02B 13/18; G02B 9/60; G02B 27/0025; H04N 5/2254
USPC .................................. 359/642–830
See application file for complete search history.

(56) References Cited

U.S. PATENT DOCUMENTS

| | | | | |
|---|---|---|---|---|
| 9,618,725 B2* | 4/2017 | Teraoka | ................... | G02B 9/62 |
| 9,618,729 B2* | 4/2017 | Teraoka | ............. | G02B 13/0045 |
| 2009/0080088 A1* | 3/2009 | Ohashi | ................. | G02B 15/173 359/687 |
| 2009/0237805 A1* | 9/2009 | Fujihara | ............... | G02B 15/173 359/687 |
| 2010/0284092 A1* | 11/2010 | Hayakawa | ........... | G02B 15/173 359/683 |
| 2016/0048003 A1* | 2/2016 | Teraoka | ............. | G02B 13/0045 359/757 |
| 2016/0109692 A1* | 4/2016 | Shibata | .................. | G02B 13/18 359/557 |
| 2016/0131869 A1* | 5/2016 | Liao | .................... | G02B 13/0045 250/208.1 |
| 2016/0154208 A1* | 6/2016 | Teraoka | ............. | G02B 13/0045 359/764 |
| 2016/0216496 A1* | 7/2016 | Shibayama | ............ | G02B 15/22 |
| 2016/0266353 A1* | 9/2016 | Teraoka | ............. | G02B 13/0045 |
| 2016/0349485 A1* | 12/2016 | Teraoka | ............. | G02B 13/0045 |
| 2016/0349486 A1* | 12/2016 | Teraoka | .................. | G02B 9/60 |
| 2016/0370559 A1* | 12/2016 | Teraoka | ............. | G02B 13/0045 |
| 2017/0102525 A1* | 4/2017 | Teraoka | ............. | G02B 13/0045 |
| 2017/0123184 A1* | 5/2017 | Teraoka | ............. | G02B 13/0045 |

* cited by examiner

*Primary Examiner* — Bumsuk Won
*Assistant Examiner* — Tamara Y Washington
(74) *Attorney, Agent, or Firm* — Na Xu; IPro, PLLC (57) ABSTRACT

A camera lens includes from an object side to an image side: a first lens with positive refractive power; a second lens with negative refractive power; a third lens with negative refractive power; a fourth lens with positive refractive power and a fifth lens with negative refractive power. Specific conditions are satisfied. The camera lens has excellent optical properties.

2 Claims, 5 Drawing Sheets

Fig. 1

Fig. 2 spherical aberration (axial chromatic aberration)

Fig. 6 spherical aberration (axial chromatic aberration)

IMAGING LENS

FIELD OF THE INVENTION

The present invention relates to a camera lens, particularly relates to a camera lens in which high-pixel CCD, CMOS camera elements are used, such as the mobile phone camera module, WEB camera etc.

DESCRIPTION OF RELATED ART

In recent years, a variety of camera devices equipped with camera elements such as CCD, CMOS and others are extensively popular. Along with the development of miniature and high performance camera elements, the ultrathin and high-luminous flux F (Fno) wide-angle camera lenses with excellent optical properties are needed in society.

The technology related to the camera lens composed of five ultrathin and high-luminous flux F (Fno) wide angle lenses with excellent optical properties is developed gradually. The camera lens mentioned in the technical development proposal is composed of five lenses, which are lined up from object side in an order as follows: The first lens with positive refractive power; the second lens with negative refractive power; the third lens with negative refractive power; the fourth lens with positive refractive power and the fifth lens with negative refractive power.

The camera lens disclosed in a related reference is composed of five lenses, but the refractive power of the first lens and the third lens is inadequate; the shape of the first lens and the second lens is improper; the axial distance between the image side of the forth lens and the object side of the fifth lens, and the proportion of the overall focus distance of the camera lenses are not proper; therefore Fno=2.25, 2ω≤74.6°, TTL/IH≥1.517, wide-angle and ultra-thin degree is not proper; Fno luminous flux is not sufficient.

The camera lens disclosed in another reference is composed of five lenses, but the refractive power of the first lens is inadequate; the shape of the second lens is improper, therefore, Fno≤2.25, 2ω≤75.6, wide angle is not sufficient; Fno luminous flux is not sufficient.

The present invention provides an improved camera lens to solve the problems.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF REFERENCE NUMBERS OR LABELS

The reference numbers or labels in all embodiments are represented as follows. In which, the unit of the distance, radius and center thickness is mm.
LA: Camera lens
S1: Open aperture
L1: The first lens
L2: The second lens
L3: The third lens
L4: The fourth lens
L5: The fifth lens
GF: G glass plate
f: Overall focal distance of the camera lens LA
f1: The focal distance of the first lens L1
f2: The focal distance of the second lens L2
f3: The focal distance of the third lens L3
f4: The focal distance of the fourth lens L4
f5: The focal distance of the fifth lens L5
Fno: F value
2ω: Total angle of view
R: Curvature radius of image side is the center curvature radius of the lens.
R1: The object side curvature radius of the first lens L1
R2: The image side curvature radius of the first lens L1
R3: The object side curvature radius of the second lens L2
R4: The image side curvature radius of the second lens L2
R5: The object side curvature radius of the third lens L3
R6: The image side curvature radius of the third lens L3
R7: The object side curvature radius of the fourth lens L4
R8: The image side curvature radius of the fourth lens L4
R9: The object side curvature radius of the fifth lens L5
R10: The image side curvature radius of the fifth lens L5
R11: The object side curvature radius of glass plate GF
R12: The image side curvature radius of glass plate GF
d: The center thickness of lenses or the distance between lenses
d0: The axial distance from the open aperture S1 to the object side of the first lens L1
d1: The center thickness of the first lens L1
d2: The axial distance between the image side of the first lens L1 and the object side of the second lens L2
d3: The center thickness of the second lens L2
d4: The axial distance between the image side of the second lens L2 and the object side of the third lens L3
d5: The center thickness of the third lens L3
d6: The axial distance between the image side of the third lens L3 and the object side of the fourth lens L4
d7: The center thickness of the fourth lens L4
d8: The axial distance between the image side of the fourth lens L4 and the object side of the fifth lens L5
d9: The center thickness of the fifth lens L5
d10: The axial distance between the image side of fifth lens L5 and the object side of the glass plate GF
d11: The center thickness of the glass plate GF
d12: The axial distance from the image side to the imaging plane of the glass plate GF nd: Refractive power of line d
nd1: Refractive power of line d of the first lens L1
nd2: Refractive power of line d of the second lens L2
nd3: Refractive power of line d of the third lens L3
nd4: Refractive power of line d of the fourth lens L4
nd5: Refractive power of line d of the fifth lens L5
nd6: Refractive power of line d of glass plate GF
v: Abbe number
v1: Abbe number of the first lens L1
v2: Abbe number of the second lens L2
v3: Abbe number of the third lens L3
v4: Abbe number of the fourth lens L4
v5: Abbe number of the fifth lens L5
v6: Abbe number of the glass plate GF
TTL: Optical length (the axial distance from the object side to the imaging plane of the first lens L1)
LB: The axial distance from the image side to the imaging plane of the sixth lens L6 (including the thickness of the glass plate GF)
IH: Image height

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the FIGS. and the embodiments. It should be understood the specific embodiments described hereby is only to explain this disclosure, not intended to limit this disclosure.

Figure 1:
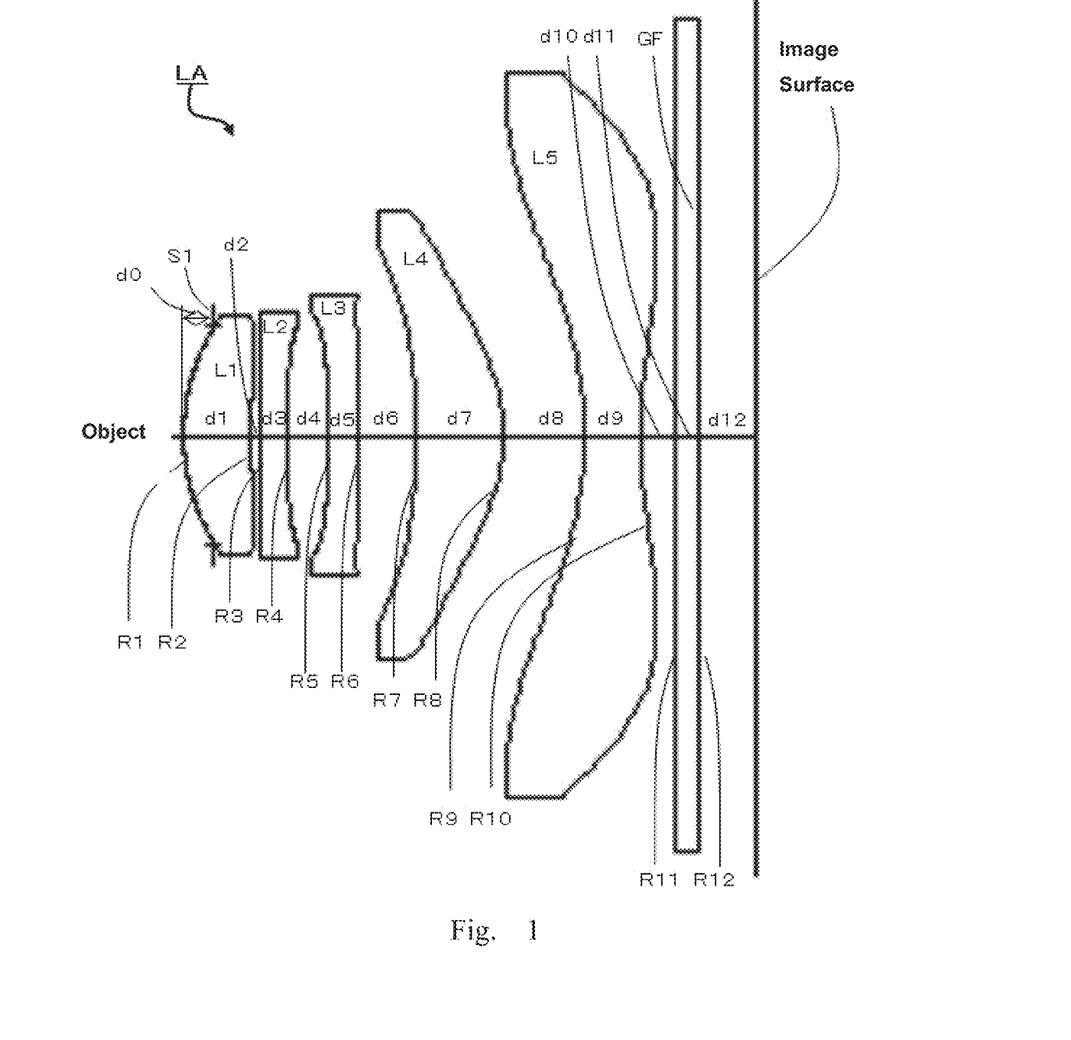
FIG. 1 is a structural diagram of a camera lens LA in one embodiment of the present invention.

The reference figures explains one embodiment of the camera lens in the present invention. FIG. 1 shows the structural diagram of one embodiment of the camera lens of the present invention; The camera lens LA includes five lenses, lined up from the object side to the image side in an order as follows: the first lens L1; the second lens L2; the third lens L3; the fourth lens L4, as well as the fifth lens L5. A glass plate GF is provided between the fifth lens L5 and the imaging plane. The glass plate GF is a cover glass or a light filter having IR cut-off filtration and other functions, or the glass plate GF is not be provided between the fifth lens L5 and the imaging plane.

The first lens L1 has positive refractive power; the second lens L2 has negative refractive power; the third lens L3 has negative refractive power; the fourth lens L4 has positive refractive power and the fifth lens L5 has negative refractive power. In order to correct aberration better, the surface of five lenses is best designed to be non-spherical shape.

The camera lens LA satisfies the following specific conditions (1) to (5):

$$0.70 \leq f1/f \leq 0.85 \quad (1)$$

$$-40.00 \leq f3/f \leq -15.00 \quad (2)$$

$$-2.00 \leq (R1+R2)/(R1-R2) \leq -1.00 \quad (3)$$

$$-0.45 \leq (R3+R4)/(R3-R4) \leq -0.15 \quad (4)$$

$$0.12 \leq d8/f \leq 0.18 \quad (5)$$

In which:
f: The overall focal distance of the camera lens LA;
f1: The focal distance of the first lens;
f3: The focal distance of the third lens;
R1: The object side curvature radius of the first lens;
R2: The image side curvature radius of the first lens;
R3: The object side curvature radius of the second lens;
R4: The image side curvature radius of the second lens;
d8: The axial distance between the image side of the fourth lens and the object side of the fifth lens.

The condition expression (1) specifies the positive refractive power of the first lens L1. When exceeding the lower limit of the condition expression (1), although conducive to the ultra-thin development of the lens, the first lens L1 has too big positive refractive power; it is difficult to correct the aberration and other issues, and also not conducive to wide-angle development of lens. On the contrary, when exceeding the upper limit, the first lens has too small positive refractive power, not conducive to the ultrathin development of lens.

Further, the limit of condition expression (1) is better set within the range of the condition expression (1-A) as follows.

$$0.75 \leq f1/f \leq 0.80 \quad (1\text{-A})$$

The condition expression (2) specifies the negative refractive power of the third lens L3. If exceeding the limit of the condition expression (2), along with the ultra-thin development of the lens, it is difficult to correct the axial and abaxial chromatic aberration.

Further, the limit of the condition expression (2) is better set within the range of the condition expression (2-A) as follows.

$$-25.00 \leq f3/f \leq -18.00 \quad (2\text{-A})$$

Condition expression (3) specifies the shape of the first lens L1. If exceeding the limit of the condition expression (3), along with the wide angle and ultra-thin development of the lens, it will be more difficult to correct the spherical aberration and other higher aberration issues.

Further, the limit of the condition expression (3) is better set within the range of the condition expression (3-A) as follows.

$$-1.60 \leq (R1+R2)/(R1-R2) \leq -1.10 \quad (3\text{-A})$$

The condition expression (4) specifies the shape of the second lens L2. If exceeding the limit of the condition expression (4), along with the ultra-thin and wide-angle development of the lens, it is difficult to correct the axial chromatic aberration.

Further, the limit of the condition expression (4) is better set within the range of the condition expression (4-A) as follows.

$$-0.40 \leq (R3+R4)/(R3-R4) \leq -0.18 \quad (4\text{-A})$$

The condition expression (5) specifies the proportion of the axial distance between the image side of the forth lens L4 and the object side of the fifth lens L5 to the overall focus distance of the camera lenses LA. If exceeding the limit of the condition expression (5), it is difficult to realize the ultrathin and wide-angle development of lens.

Not only that, the camera lens LA also meets the following condition expression (6):

$$0.05 \leq d6/f \leq 0.15 \quad (6)$$

In which:
f: Overall focal distance of the camera lens LA;
d6: The axial distance between the image side of the third lens and the object side of the fourth lens.

The condition expression (6) specifies the proportion of the distance between the image side of the forth lens L3 and the object side of the fourth lens L4 to the overall focus distance of the camera lens LA. If exceeding the limit of the condition expression (6), it is not conducive to the wide angle and ultra-thin development of the lens.

As five lenses of the camera lens LA have the structure described previously and meet all condition expressions, the present invention can make the camera lens composed of five lenses which have excellent optical properties, TTL (optical length)/IH (image height)≤1.35, ultra-thin and wide-angle 2ω82°, high-luminous flux Fno≤2.2.

Embodiment

The camera lens LA of the present invention is described with the embodiments as follows. The symbols in all embodiments are represented as follows. In addition, the unit of the distance, radius and center thickness is mm.
f: The overall focal distance of the camera lens LA
f1: The focal distance of the first lens L1
f2: The focal distance of the second lens L2
f3: The focal distance of the third lens L3
f4: The focal distance of the fourth lens L4
f5: The focal distance of the fifth lens L5
Fno: F value
2ω: Total angle of view
S1: Open aperture
R: Curvature radius of image side is the center curvature radius of the lens.
R1: The object side curvature radius of the first lens L1
R2: The image side curvature radius of the first lens L1
R3: The object side curvature radius of the second lens L2
R4: The image side curvature radius of the second lens L2
R5: The object side curvature radius of the third lens L3
R6: The image side curvature radius of the third lens L3
R7: The object side curvature radius of the fourth lens L4
R8: The image side curvature radius of the fourth lens L4
R9: The object side curvature radius of the fifth lens L5
R10: The image side curvature radius of the fifth lens L5
R11: The object side curvature radius of the glass plate GF;
R12: The image side curvature radius of glass plate GF
d: Center thickness of lenses or the distance between lenses;
d0: The axial distance from the open aperture S1 to the object side of the first lens L1
d1: The center thickness of the first lens L1
d2: The axial distance between the image side of the first lens L1 and the object side of the second lens L2
d3: The center thickness of the second lens L2
d4: The axial distance between the image side of the second lens L2 and the object side of the third lens L3
d5: The center thickness of the third lens L3
d6: The axial distance between the image side of the third lens L3 and the object side of the fourth lens L4
d7: The center thickness of the fourth lens L4
d8: The axial distance between the image side of the fourth lens L4 and the object side of the fifth lens L5
d9: The center thickness of the fifth lens L5
d10: The axial distance between the image side of fifth lens L5 and the object side of the glass plate GF
d11: The center thickness of the glass plate GF
d12: The axial distance from the image side to the imaging plane of the glass plate GF
nd: Refractive power of line d
nd1: Refractive power of line d of the first lens L1
nd2: Refractive power of line d of the second lens L2
nd3: Refractive power of line d of the third lens L3
nd4: Refractive power of line d of the fourth lens L4
nd5: Refractive power of line d of the fifth lens L5
nd6: Refractive power of line d of glass plate GF
v: Abbe number
v1: Abbe number of the first lens L1
v2: Abbe number of the second lens L2
v3: Abbe number of the third lens L3
v4: Abbe number of the fourth lens L4
v5: Abbe number of the fifth lens L5
v6: Abbe number of the glass plate GF
TTL: Optical length (the axial distance from the object side to the imaging plane of the first lens L1)
LB: The axial distance from the image side to the imaging plane of the fifths lens L5 (including the thickness of the glass plate GF).
IH: Image height As a matter of convenience, the aspheric surface of all lenses adopts the aspheric surface in following condition expression (7). But not limited to the polynomial forms of the aspheric surface in the condition expression (7).

$$y = (x^2/R)/[1 + \{1 - (k+1)(x^2/R^2)\}1/2] + A4 \times 4 + A6 \times 6 + A8 \times 8 + A10 \times 10 + A12 \times 12 + A14 \times 14 + A16 \times 16 \quad (7)$$

In which, R is the axial curvature radius; k is the cone constant, A4, A6, A8, A10, A12, A14, A16 are aspherical coefficients.

Embodiment 1

Figure 2:
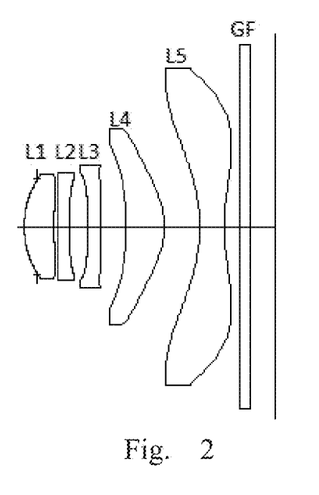
FIG. 2 is a structural diagram of the embodiment 1 of the camera lens LA.

FIG. 2 is the structure diagram of the camera lens LA in the embodiment 1; The curvature radius R of the object side and image side of the first L1 to the fifth lens L5, center thickness of the lenses or the distance d between the lenses, refractive power nd and Abbe number v of the camera lens LA in the embodiment 1 are shown in table 1. The cone constant k and aspherical coefficients are shown in table 2.

TABLE 1

|     | R        | d     |        | nd   |        | v d |       |
|-----|----------|-------|--------|------|--------|-----|-------|
| S1  | ∞        | d0 =  | −0.250 |      |        |     |       |
| R1  | 1.71516  | d1 =  | 0.582  | nd1  | 1.5831 | v 1 | 59.39 |
| R2  | 18.15329 | d2 =  | 0.081  |      |        |     |       |
| R3  | −7.70784 | d3 =  | 0.218  | nd2  | 1.6422 | v 2 | 22.41 |
| R4  | 11.56310 | d4 =  | 0.340  |      |        |     |       |
| R5  | 11.27652 | d5 =  | 0.277  | nd3  | 1.6422 | v 3 | 22.41 |
| R6  | 9.45536  | d6 =  | 0.489  |      |        |     |       |
| R7  | −6.00986 | d7 =  | 0.751  | nd4  | 1.5441 | v 4 | 56.12 |
| R8  | −1.45598 | d8 =  | 0.691  |      |        |     |       |
| R9  | −3.17296 | d9 =  | 0.471  | nd5  | 1.5352 | v 5 | 56.12 |
| R10 | 3.13048  | d10 = | 0.300  |      |        |     |       |
| R11 | ∞        | d11 = | 0.210  | nd6  | 1.5168 | v 6 | 64.17 |
| R12 | ∞        | d12 = | 0.496  |      |        |     |       |

TABLE 2

| | Cone Constant | Aspherical Coeffecient | | | | | | |
|---|---|---|---|---|---|---|---|---|
| | k | A4 | A6 | A8 | A10 | A12 | A14 | A16 |
| R1 | 0.0000E+00 | −6.5612E−03 | 2.1109E−02 | −2.4977E−02 | −7.9177E−03 | 1.3802E−02 | 1.0464E−02 | −1.5632E−02 |
| R2 | 0.0000E+00 | −1.9655E−02 | −6.3998E−04 | 3.7766E−02 | −2.3599E−02 | −2.6374E−02 | −3.2674E−03 | 6.3505E−03 |
| R3 | 0.0000E+00 | 4.1617E−02 | 3.2250E−02 | 8.6313E−04 | −5.3478E−04 | −2.4175E−02 | −3.4631E−02 | 3.3670E−02 |
| R4 | 0.0000E+00 | 4.6765E−02 | 2.4293E−02 | 2.3061E−02 | −2.6636E−02 | −3.3893E−02 | 1.8914E−02 | 5.7620E−04 |

TABLE 2-continued

| | Cone Constant | Aspherical Coeffecient | | | | | | |
|---|---|---|---|---|---|---|---|---|
| | k | A4 | A6 | A8 | A10 | A12 | A14 | A16 |
| R5 | −8.0261E+01 | −1.4587E−01 | 1.5241E−02 | −1.6512E−02 | 9.1372E−03 | 2.9409E−02 | 1.7337E−02 | −4.0923E−02 |
| R6 | 5.6933E+01 | −1.1356E−01 | −5.1845E−03 | 1.5547E−02 | 5.9934E−03 | 2.7493E−03 | 1.4861E−03 | −1.3053E−03 |
| R7 | 8.3027E+00 | −5.8232E−03 | 2.5771E−03 | −6.7674E−03 | 1.5386E−03 | 5.7102E−04 | −1.1787E−04 | −1.0100E−06 |
| R8 | −3.8890E+00 | −4.7527E−02 | 2.9464E−02 | −4.2066E−03 | −5.1228E−04 | 2.0772E−05 | 4.5664E−05 | −8.0325E−06 |
| R9 | −4.2249E+00 | −8.7977E−03 | 2.4770E−03 | −1.9497E−05 | −2.0738E−05 | 2.3068E−07 | 1.3328E−07 | −4.9383E−09 |
| R10 | −2.1998E+01 | −1.7572E−02 | 2.4554E−03 | −4.2290E−04 | 2.1201E−05 | −1.1613E−07 | 1.9518E−08 | 6.3393E−10 |

The values in the embodiments 1-2 and the corresponding values of the parameters specified in the condition expressions (1)-(6) are listed in following table 5.

As shown in table 2, the embodiment 1 meets the condition expression (1) to (6).

Figure 3:
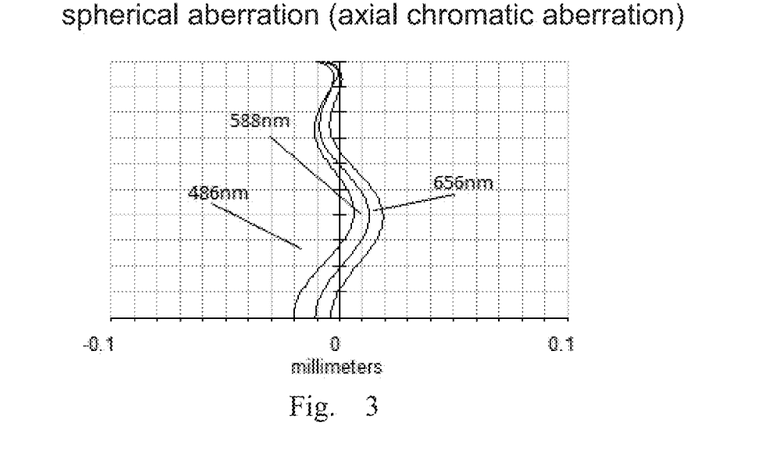
FIG. 3 is the diagram of the spherical aberration (axial chromatic aberration) of the camera lens LA in the embodiment 1.
Figure 4:
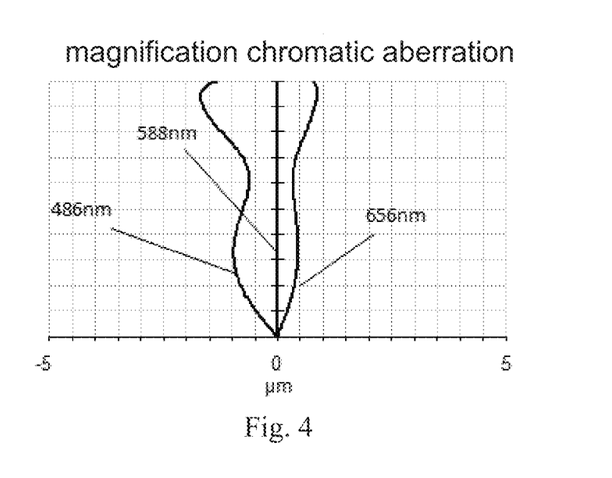
FIG. 4 is the diagram of the magnification chromatic aberration of the camera lens LA in the embodiment 1.
Figure 5:
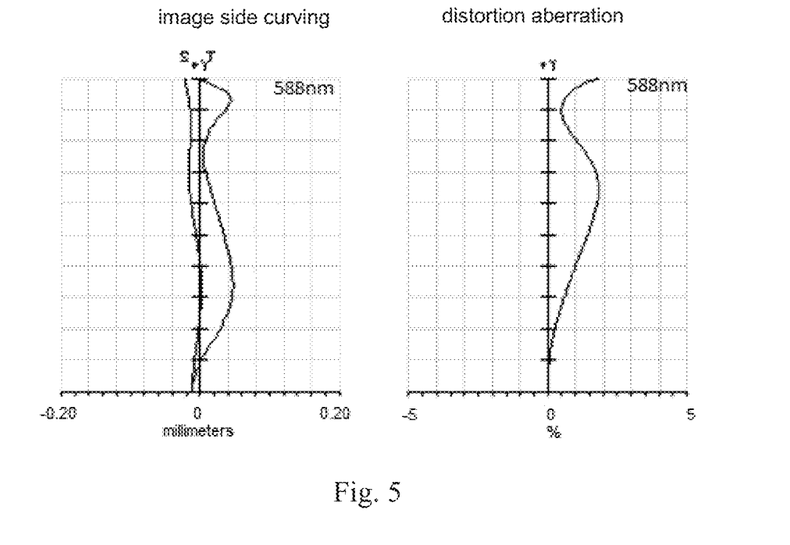
FIG. 5 is the diagram of the image side curving and distortion aberration of the camera lens LA in the embodiment 1.

FIG. 3 is the diagram of the spherical aberration (axial chromatic aberration) of the camera lens LA in the embodiment 1; FIG. 4 is the diagram of the magnification chromatic aberration; FIG. 5 is the diagram of the image side curving and distortion aberration; In addition, the image side curving S in FIG. 5 is the image side curving relative to sagittal plane; T is the image side curving relative to the tangent plane. It is same also in embodiment 2. $2\omega=84.5°$, TTL/IH=1.311, Fno=2.15, ultra-thin, high-luminous flux wide-angle lenses of the camera lens LA of the embodiment 1 as shown in FIGS. 3 to 5 are easy to understand that they have excellent optical properties.

Embodiment 2

Figure 6:
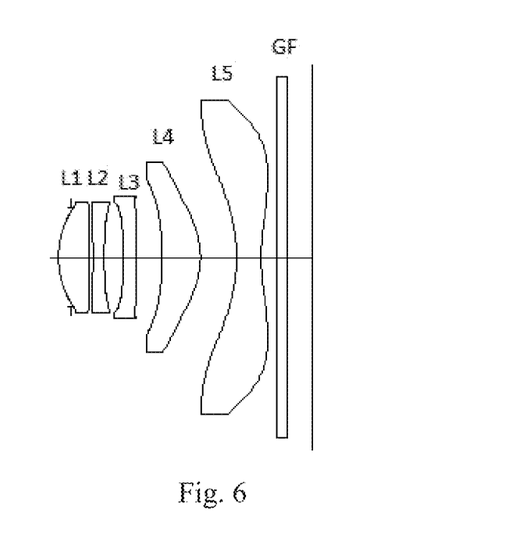
FIG. 6 is the structural diagram of the embodiment 2 of the camera lens LA.

FIG. 6 is the structural diagram of the camera lens LA in the embodiment 2; The curvature radius R of the object side and image side of the first lens L1 to fifth lens L5, center thickness of the lenses or the distance d between the lenses, refractive power nd and Abbe number v of the camera lens LA in the embodiment 3 are shown in table 3. The cone constant k and aspherical coefficients are shown in table 4.

TABLE 3

| | R | d | | nd | | v d | |
|---|---|---|---|---|---|---|---|
| S1 | ∞ | d0 = | −0.250 | | | | |
| R1 | 1.70135 | d1 = | 0.592 | nd1 | 1.5831 | v 1 | 59.39 |
| R2 | 19.49445 | d2 = | 0.080 | | | | |
| R3 | −6.71795 | d3 = | 0.221 | nd2 | 1.6422 | v 2 | 22.41 |
| R4 | 14.46650 | d4 = | 0.347 | | | | |
| R5 | 11.84192 | d5 = | 0.279 | nd3 | 1.6422 | v 3 | 22.41 |
| R6 | 9.41962 | d6 = | 0.491 | | | | |
| R7 | −5.74110 | d7 = | 0.749 | nd4 | 1.5441 | v 4 | 56.12 |
| R8 | −1.47024 | d8 = | 0.703 | | | | |
| R9 | −3.05380 | d9 = | 0.463 | nd5 | 1.5352 | v 5 | 56.12 |
| R10 | 3.15301 | d10 = | 0.300 | | | | |
| R11 | ∞ | d11 = | 0.210 | nd6 | 1.5168 | v 6 | 64.17 |
| R12 | ∞ | d12 = | 0.501 | | | | |

TABLE 4

| | Cone Constant | Aspherical Coeffecient | | | | | | |
|---|---|---|---|---|---|---|---|---|
| | k | A4 | A6 | A8 | A10 | A12 | A14 | A16 |
| R1 | 0.0000E+00 | −6.3284E−03 | 2.1584E−02 | −2.4580E−02 | −7.6640E−03 | 1.3934E−02 | 1.0506E−02 | −1.5656E−02 |
| R2 | 0.0000E+00 | −1.8973E−02 | −7.6953E−04 | 3.7680E−02 | −2.3567E−02 | −2.6256E−02 | −3.0923E−03 | 6.5696E−03 |
| R3 | 0.0000E+00 | 4.1696E−02 | 3.2478E−02 | 9.5164E−04 | −5.4796E−04 | −2.4269E−02 | −3.4785E−02 | 3.3476E−02 |
| R4 | 0.0000E+00 | 4.7110E−02 | 2.4910E−02 | 2.3296E−02 | −2.6627E−02 | −3.3949E−02 | 1.8893E−02 | 5.7238E−04 |
| R5 | −7.6909E+01 | −1.4568E−01 | 1.5313E−02 | −1.6723E−02 | 8.8398E−03 | 2.9160E−02 | 1.7144E−02 | −4.1060E−02 |
| R6 | 5.6719E+01 | −1.1372E−01 | −5.1554E−03 | 1.5569E−02 | 5.9839E−03 | 2.7215E−03 | 1.4512E−03 | −1.3416E−03 |
| R7 | 8.3140E+00 | −5.9462E−03 | 2.5659E−03 | −6.7758E−03 | 1.5370E−03 | 5.7191E−04 | −1.1672E−04 | −4.6700E−07 |
| R8 | −3.9695E+00 | −4.7294E−02 | 2.9481E−02 | −4.1949E−03 | −5.0868E−04 | 2.1714E−05 | 4.5897E−05 | −7.9759E−06 |
| R9 | −4.2071E+00 | −8.8098E−03 | 2.4767E−03 | −1.9368E−05 | −2.0694E−05 | 2.4018E−07 | 1.3500E−07 | −4.6553E−09 |
| R10 | −2.2043E+01 | −1.7640E−02 | 2.4518E−03 | −4.2298E−04 | 2.1208E−05 | −1.1481E−07 | 1.9646E−08 | 6.4253E−10 |

As shown in table 4, the embodiment 2 meets the condition expression (1) to (6).

Figure 7:
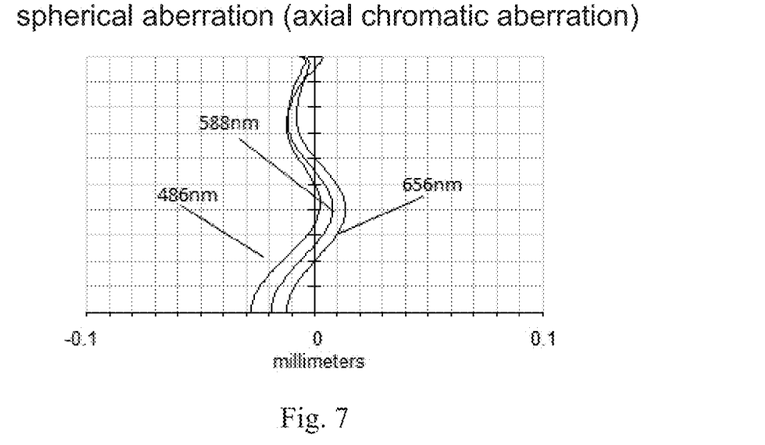
FIG. 7 is the diagram of the spherical aberration (axial chromatic aberration) of the camera lens LA in the embodiment 2.
Figure 8:
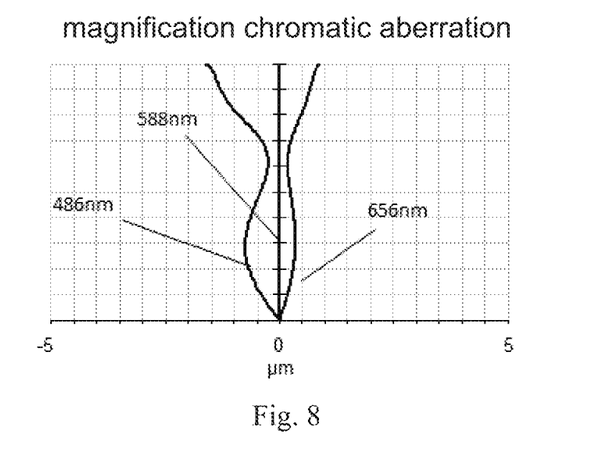
FIG. 8 is the diagram of the magnification chromatic aberration of the camera lens LA in the embodiment 2.
Figure 9:
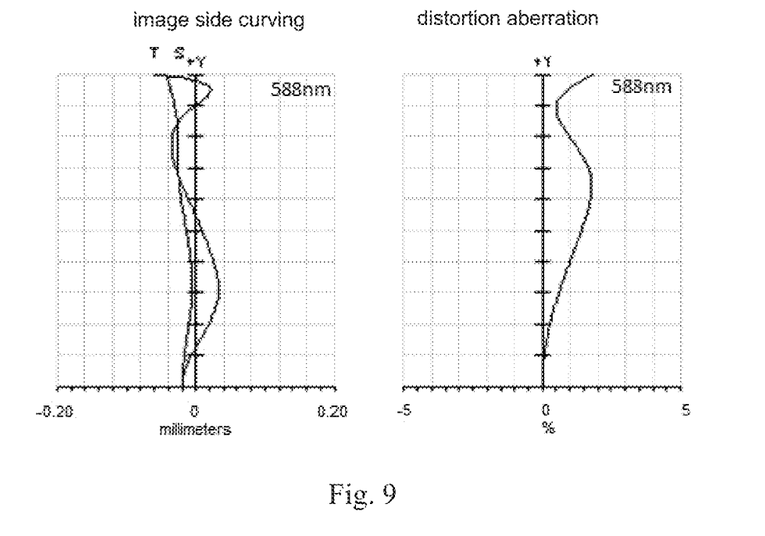
FIG. 9 is the diagram of the image side curving and distortion aberration of the camera lens LA in the embodiment 2.

FIG. 7 is the diagram of the spherical aberration (axial chromatic aberration) of the camera lens LA in the embodiment 2; FIG. 8 is the diagram of the magnification chromatic aberration; FIG. 9 is the diagram of the image side curving and distortion aberration; As shown in FIGS. 7 to 9, for full image angle $2\omega)=83.3°$, TTL/IH=1.319, Fno=2.15 ultra-thin, high-luminous flux wide-angle lenses of the camera lens LA in the embodiment 2 are easy to understand that they have excellent optical properties.

The values of the embodiments and the corresponding values of the parameters specified in the condition expressions (1) to (6) are listed in table 5. In addition, the units in table are respectively 2ω(°), F (mm), f1 (mm), f2 (mm), f3 (mm), f4 (mm), f5 (mm), TTL (mm), LB (mm), IH (mm).

TABLE 5

| | Embodiment 1 | Embodiment 2 | Condition |
|---|---|---|---|
| f1/f | 0.795 | 0.769 | 1 |
| f3/f | −17.349 | −18.297 | 2 |
| (R1 + R2)/(R1 − R2) | −1.209 | −1.191 | 3 |
| (R3 + R4)/(R3 − R4) | −0.200 | −0.366 | 4 |
| d8/f | 0.171 | 0.171 | 5 |
| d6/f | 0.121 | 0.120 | 6 |
| Fno | 2.15 | 2.15 | |
| 2ω | 84.5 | 83.3 | |
| TTL/IH | 1.311 | 1.319 | |
| f | 4.031 | 4.104 | |
| f1 | 3.206 | 3.158 | |
| f2 | −7.170 | −7.115 | |
| f3 | −69.932 | −75.089 | |

TABLE 5-continued

|  | Embodiment 1 | Embodiment 2 | Condition |
|---|---|---|---|
| f4 | 3.338 | 3.421 | |
| f5 | −2.869 | −2.825 | |
| TTL | 4.906 | 4.936 | |
| LB | 1.006 | 1.011 | |
| IH | 3.743 | 3.743 | |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera lens comprises, from an object side to an image side: a first lens with positive refractive power; a second lens with negative refractive power; a third lens with negative refractive power; a fourth lens with positive refractive power and a fifth lens with negative refractive power, the camera lens satisfying the following conditions:

$$0.70 \leq f1/f \leq 0.85;$$

$$-40.00 \leq f3/f \leq -15.00;$$

$$-2.00 \leq (R1+R2)/(R1-R2) \leq -1.209;$$

$$-0.45 \leq (R3+R4)/(R3-R4) \leq -0.15;$$

$$0.12 \leq d8/f \leq 0.18;$$

where, f is the overall focal distance of the camera lens; f1 is the focal distance of the first lens; f3 is the focal distance of the third lens; R1 is the object side curvature radius of the first lens; R2 is the image side curvature radius of the first lens; R3 is the object side curvature radius of the second lens; R4 is the image side curvature radius of the second lens; d8 is the axial distance between the image side of the fourth lens and the object side of the fifth lens.

2. The camera lens according to claim 1 further satisfying the following conditions:

$$0.05 \leq d6/f \leq 0.15$$

wherein, f is the overall focal distance of the camera lens; d6 is the axial distance between the image side of the third lens and the object side of the fourth lens.

* * * * *